Sept. 7, 1954        E. H. COXE        2,688,653
SUPPORT FOR ELECTRICAL CONDUCTORS
Filed Nov. 16, 1953
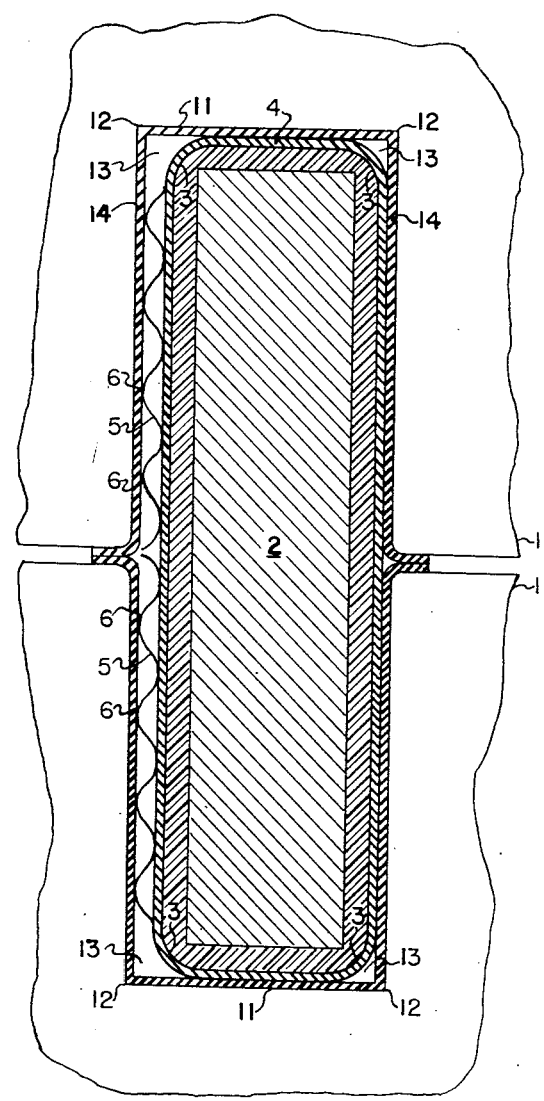
*INVENTOR.*
EDWARD H. COXE
BY Kenneth Swartwood
ATTORNEY Patented Sept. 7, 1954

2,688,653

UNITED STATES PATENT OFFICE 2,688,653

SUPPORT FOR ELECTRICAL CONDUCTORS

Edward H. Coxe, Baton Rouge, La., assignor to Ethyl Corporation, New York, N. Y., a corporation of Delaware Application November 16, 1953, Serial No. 392,179

1 Claim. (Cl. 174—156)

This invention relates to improved support and insulation for high voltage electrical conductors. More particularly, the invention relates to improvements in the mounting of insulated bus bars in order to minimize or prevent arcing and corona effects.

In the electrolytic chemical industries, very large amperages of alternating current are required prior to rectification to direct current. Such power supply is distributed to rectifying and switch gear equipment in copper bus bars, which are usually sheathed with a continuous layer of insulating composition. In support and alignment of such bus bar systems in substations or similar locations, reinforced phenolic resin support bars are employed. This material is an effective insulating material as well as providing the adequate mechanical strength in supporting and aligning the heavy bus bars. In substantially all instances, a pair of support bars are employed, each having rectangular notches corresponding to half the width of the insulated bus bar to be retained. Ordinarily, these notches are cut with sharply squared corners and the distance between the walls of the notches are only approximately equivalent to the thickness of the bus bars with the insulating sheath.

If the bus bar insulation is perfectly rectangular in external cross section, and the thickness of the insulated bus bar assembly coincides exactly with the width of the notch in the support bars, it is apparent that quite rigid and close contact is made at all points of potential contact. Unfortunately, however, the insulated sheaths of the bus bars have rounded corners. In addition, the ordinary processes of manufacture do not provide for a snug fit at all points of the assembly. Because of these always present minor deviations in fit, bus bars carrying large currents at high voltages, with respect to ground, and the other phases of the polyphase circuit, have a strong tendency to form corona at the corners of the notch and the fissures adjacent the bus bar insulator sides. The corona has a severely adverse effect on insulating material, and this adverse effect is accentuated in warm, damp climates. As a result of extended exposure, particularly at the corners, insulation under such atmospheric conditions will break down and slough off at a relatively rapid rate and create the possibility of arcing and consequent disruption of service.

The object of the present invention is to provide improvements in bus bar insulation and support assemblies, and obviate the above described difficulties. More specifically, an object of the invention is to provide an insulated bus bar-support bar joint which fully eliminates the corona even under the most adverse climatic conditions. An additional object is to extend the life of bus bar insulation at such joints.

Broadly speaking, the invention includes a conductive coating applied to the exterior of the bus bar insulation adjacent the support bars and notches and extending somewhat beyond the point of entry on both sides of said bars, in combination with an equivalent coating on the walls and bottom of the support bars and notches, plus compressive elements of conductive metal which compensate for inaccuracies in fit of the treated bus bar and the treated support bars with respect to fit.

The method of preparing the improvement and its application will be readily understood from the following description and the accompanying figure. The figure being an elevation and partial section of a typical joint of a pair of support bars supporting and aligning an insulated bus bar. Referring to the figure, the principal components are two support bars 1 and a bus bar 2. The bus bar is sheathed in a layer of approximately $\tfrac{3}{16}''$ thickness of an insulating material. Such insulation may be a phenolic resin, rubber, or the like which is molded on the bus bar. Notches 11 are cut in the support bars 1 deep enough to receive approximately one-half of the vertical dimension of the insulated bus bar. The corners 12 of the notches are sharp, whereas, owing to the method of molding the insulation on to the bus bar, the corners 3 of the molded insulation are slightly rounded having a radius of about $\tfrac{1}{8}''$. As a result, there are gaps 13 at these points in the joint.

A layer 4 of semi-conductive coating is applied to the exterior of the bus bar insulating sheath and extends entirely around the periphery. The width of this coating strip is slightly greater than the depth of the support bars 1, this extension being termed a creepage distance. Similar coating layers 14 are applied to the support bars on all surfaces of the notches 11 plus a small creepage portion adjacent the edges of the notches and on the principal faces of the support bars. Clips or compression elements 5 are positioned in the notches adjacent the bus bar, one in each notch. The clip 5 may take a variety of forms and the configuration is shown on a slightly exaggerated scale in the figure. The spring action desired is provided in indentations 6 at several points along its length. If desired, this action can be provided by a slight twist or by kinking at other points.

The conductive coating employed may involve a variety of materials. Among the materials which have been found quite effective are colorless lacquers having finely divided carbon interspersed therein, aluminum paint, bronze paint, or other coatings which include dispersions of microscopic particles of conductive solids. The clips 5, as already mentioned, are made of conductive materials which retain the original set for an indefinite period. Thus, hard brass, bronze, and similar conductive metals of this nature are quite effective.

Having fully described the invention, what I desire to claim is:

In combination an insulated bus bar and a retaining support therefor, including a bus bar having a molded insulating sheath, a pair of support bars of insulating material, said support bars having corresponding rectangular notches for receiving approximately one-half the width of the insulated bus bar and being transversely positioned to the bus bar thereby retaining the insulated bus bar in a rectangular hole formed by the notches, a semi-conductive coating strip around the periphery of the insulating sheath on the bus bar and adjacent the said notches, a semi-conductive coating on the surfaces of said notches, and spring elements of electrically conductive material positioned between one wall of each notch in the support bars and the adjacent bus bar insulating sheath, said spring elements firmly pressing the bus bar against the opposite wall of the notch.

No references cited.